(12) United States Patent
Du et al.

(10) Patent No.: US 8,038,867 B2
(45) Date of Patent: Oct. 18, 2011

(54) ELECTRODIALYSIS DEVICE AND PROCESS

(75) Inventors: Yu Du, Raleigh, NC (US); Yunfeng Liu, Shanghai (CN); Saijun Mao, Shanghai (CN); Xiaoming Yuan, Shanghai (CN); Chao Yang, Shanghai (CN); Rihua Xiong, Shanghai (CN); Chun Cao, Shanghai (CN); Shengxian Wang, Shanghai (CN); Wei Cai, Shanghai (CN); Chang Wei, Niskayuna, NY (US); Jiyang Xia, Shanghai (CN)

(73) Assignee: General Electric Company, Niskayuna, NY (US)

( * ) Notice: Subject to any disclaimer, the term of this patent is extended or adjusted under 35 U.S.C. 154(b) by 915 days.

(21) Appl. No.: 12/016,518

(22) Filed: Jan. 18, 2008

(65) Prior Publication Data

US 2009/0159460 A1    Jun. 25, 2009

(30) Foreign Application Priority Data

Dec. 25, 2007    (CN) .......................... 2007 1 0301563

(51) Int. Cl.
*C02F 1/46* (2006.01)
*B01D 61/44* (2006.01)

(52) U.S. Cl. ......... 205/744; 205/743; 205/746; 205/770

(58) Field of Classification Search .................. 204/518, 204/519, 627, 628; 205/107, 742, 744, 746, 205/748, 770; 210/321.62, 321.69, 636
See application file for complete search history.

(56) References Cited

U.S. PATENT DOCUMENTS

| | | | |
|---|---|---|---|
| 3,029,196 A | | 10/1962 | Matz et al. |
| 3,597,339 A | * | 8/1971 | Newman et al. ............. 205/107 |
| 4,571,287 A | * | 2/1986 | Okubo et al. ................. 205/107 |
| 5,062,940 A | * | 11/1991 | Davies ....................... 204/229.6 |
| 6,090,258 A | | 7/2000 | Mirsky et al. |
| 2002/0139689 A1 | * | 10/2002 | Zolotarsky et al. .......... 205/342 |
| 2006/0231406 A1 | | 10/2006 | Freydina et al. |

FOREIGN PATENT DOCUMENTS

| | | |
|---|---|---|
| EP | 1731198 A1 * | 12/2006 |
| JP | 56010303 | 2/1981 |
| WO | WO0206163 A1 | 1/2002 |

OTHER PUBLICATIONS

H. Lee, S. Moon, S. Tsai. "Effects of pulsed electric fields on membrane fouling in electrodialysis of NaCl solution containing humate." Separation and Purification Technology. vol. 27, Issue 2. May 2002. pp. 89-95.*

Mishcuk et al., "Intensification of Electrodialysis By Applying a Non-Stationary Electric Field", Colloids and Surfaces, vol. 176, pp. 195-212, 2001.

PCT International Search Report dated May 13, 2009.

* cited by examiner

*Primary Examiner* — Keith Hendricks
*Assistant Examiner* — Steven A. Friday
(74) *Attorney, Agent, or Firm* — Mary Louise Gioeni

(57) ABSTRACT

A device includes a first electrode and a second electrode spaced from the first electrode to define a volume. An anion exchange membrane and a cation exchange membrane are disposed within the volume. A controller controls a supply of electrical current from an electrical source to the first electrode and to the second electrode. The electrical current supply is controlled to switch from a first mode of operation to a second mode of operation providing electrical current having a reverse polarity during each cycle. The electrical current is supplied at a controlled cycle rate and for a controlled duration. The cycle rate is greater than about 100 hertz and less than about 10 kilohertz.

5 Claims, 7 Drawing Sheets

ELECTRODIALYSIS DEVICE AND PROCESS

RELATED APPLICATIONS

This application claims priority to Chinese Patent Application No. 200710301563.4, filed Dec. 25, 2007, which is herein incorporated in its entirety by reference.

BACKGROUND

1. Technical Field

The invention includes embodiments that relate to a device for water desalination. The invention includes embodiments that relate to a process for water desalination.

2. Discussion of Art

Electrodialysis processes and devices have been used for water desalination. An electrodialysis device may include ion exchange membranes between a pair of electrodes. The membranes may be of two types: cation exchange membranes and anion exchange membranes. The cation exchange membranes may be relatively permeable to positively charged ions ("cations") with a low molecular weight and relatively impermeable to negatively charged ions ("anions"); and anion exchange membranes may be relatively permeable to anions with a low molecular weight. The cation exchange membranes and anion exchange membranes alternate between the above-mentioned electrode pairs, with compartments between the membranes. When a direct electric current passes between the electrodes, cations may be pulled toward the negatively charged electrode and pass through cation exchange membranes but not through anion exchange membranes. Simultaneously, anions in the solutions may be pulled toward the positively charged electrode and pass through anion exchange membranes, but not through cation exchange membranes. As a result, compartments on a cathode side of the anion exchange membrane (on an anode side of the cation exchange membrane) may be partially deionized by the direct electric current, and may be called "diluting" compartments. Compartments on an anode side of the anion exchange membranes (on a cathode side of cation exchange membrane) accumulate the ions removed from the diluting spaces, and may be called "concentrating" compartments. The electrodialysis process may be made continuous by flowing the solutions between the membranes.

The rate of desalination may relate to the amount of the direct electric current. Current density is the current per unit area of membrane. An increase of the current density may result in an increased rate of desalination. But polarization effects may provide an upper limit of useful current density. Polarization may be a local change of concentration caused by depletion of salt from the solution in the immediate vicinity of the membranes that results from an ion-transport phenomena and that may result in an undesirably high ohmic resistance. The limiting current may be reached when the ion concentration in the solution close to the membrane surface approaches zero. In practice, water may electrolyze into hydrogen and hydroxyl ions and participate in the ion transport, and such an electrodialysis of water may decrease current efficiency. An electrolytic potential may provide an upper limit to the effective current amount. There may be also induced changes of pH that promote precipitation of various substances on the membrane surfaces causing membrane damage. Such precipitation may be referred to as "fouling".

Electrodialysis reversal technology involves periodical reversal of the polarity of voltage/current applied to the electrodes to prevent or to removed precipitate or scale. Polarity reversal destroys freshly precipitated scale to allow flushing and to avoid damage to the membrane. However, in the electrodialysis removal operation, the function of dilute compartments may change into concentrate compartments, and the function of concentrate compartments may change into dilute compartment when the voltage or current polarity reverses. This reversal may require the corresponding dilute and concentrate flow path be switched correspondingly. This may result in a need for an unduly complicated hydraulic flow path and valve control. And the electrodialysis reversal process consumes a considerable amount of energy.

It may be desirable to have a device for desalination that differs from those devices that are commercially available. It may be desirable to have a process that differs from those processes that are currently available.

BRIEF DESCRIPTION

In one embodiment, a device includes a first electrode and a second electrode spaced from the first electrode to define a volume. An anion exchange membrane and a cation exchange membrane are disposed within the volume. A controller controls a supply of electrical current from an electrical source to the first electrode and to the second electrode. The electrical current supply is controlled to switch from a first mode of operation to a second mode of operation providing electrical current having a reverse polarity during each cycle. The electrical current is supplied at a controlled cycle rate and for a controlled duration. The cycle rate is greater than about 100 hertz and less than about 10 kilohertz.

In one embodiment, an electrodialysis device includes a first electrode and a second electrode spaced from the first electrode to define a volume, a power supply capable of sending pulsed direct electric current to the first electrode and to the second electrode; and a controller capable of controlling the device so that the device operates through a plurality of cycles. At least one of the plurality of cycles includes a deionization stage, in which a direct current power supply passes a forward electrical direct current ($I_f$) to the first and second electrodes for a first duration (t1), so as to power a first positive electrode and second negative electrode; and a recovering stage, in which the power supply sends a reverse electrical direct current ($I_r$) to each of the first and the second electrodes in a direction opposite to the forward electrical direct current for a second duration (t2). The frequency of each cycle of the pluralities of cycles over an operating period is in a range of about 100 hertz to about 10 kilohertz.

In one embodiment, an electrodialysis process uses an electrodialysis device. The process includes a plurality of cycles, and at least one of the plurality of cycles includes a deionization stage, in which a direct current power supply passes a forward electrical direct current ($I_f$) to the first and second electrodes for a first duration (t1), so as to power a first positive electrode and second negative electrode; and a recovering stage, in which the power supply sends a reverse electrical direct current ($I_r$) to each of the first and the second electrodes in a direction opposite to the forward electrical direct current for a second duration (t2). The frequency of each cycle of the pluralities of cycles over an operating period is in a range of about 100 hertz to about 10 kilohertz.

In one embodiment, an electrodialysis process uses an electrodialysis device having a dilute compartment. The process includes flowing feed water into the electrodialysis device; energizing an electrode in the electrodialysis device with a first forward electrical direct current; monitoring an ion concentration in the dilute compartment of the electrodialysis device for an increase in ion concentration relative to a first preset ion concentration; energizing the electrode with a electrical direct current of reverse polarity, before the monitored ion concentration becomes lower than the first preset ion concentration; monitoring an ion concentration in a dilute compartment of the electrodialysis device relative to a second preset ion concentration; and energizing the electrode with a second forward electrical direct current in response to the ion concentration in the dilute compartment reaching the second present ion concentration.

DRAWINGS

In the accompanying drawings like characters represent like parts throughout the drawings, wherein.

DETAILED DESCRIPTION

Figure 1:
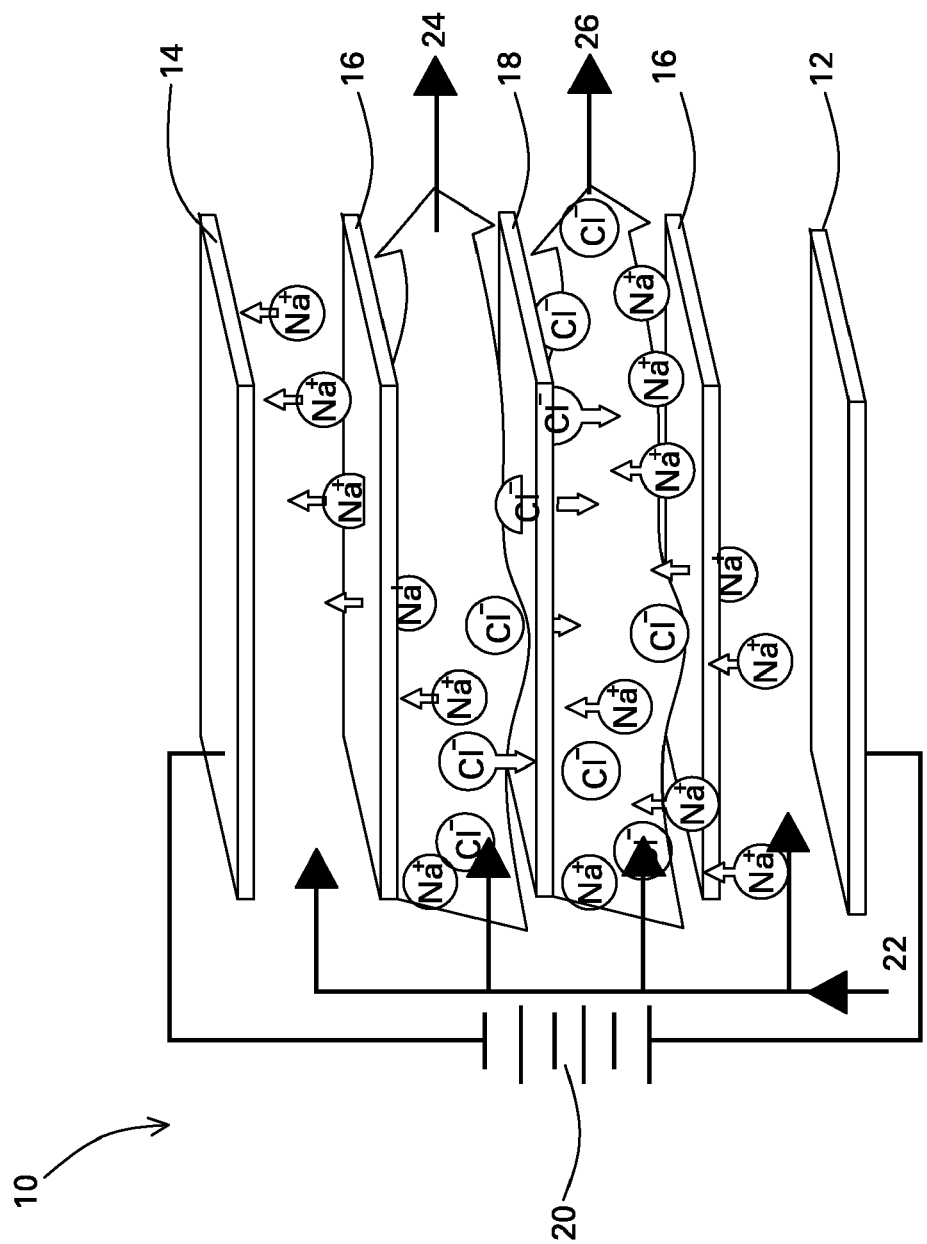
FIG. 1 illustrates an exemplary electrodialysis (ED) device.

The invention includes embodiments that relate to a device for water desalination. The invention includes embodiments that relate to a process for water desalination.

In one embodiment, a device is provided that includes a first electrode and a second electrode spaced from the first electrode to define a volume, and a controller. The controller can control a supply of electrical current from an electrical source to the first electrode and to the second electrode. The electrical current supply is controlled to switch from a first mode of operation to a second mode of operation during each cycle. In the second mode of operation the electrical current supply provides electrical current having a polarity that is reverse from the polarity of the current provided during the first operating mode. The electrical current is supplied at a controlled cycle rate and for a controlled duration.

The electrodialysis device may include a dilute compartment. In certain embodiments, the controller further controls valves that block or allow a flow of feed water through the device so as to provide motive force to a stream through a concentrated ion chamber, and to a dilute ion chamber or output.

The device may further include an ion exchange membrane disposed in contact with a feedwater flowpath and proximate to one or more of the electrodes. In one embodiment, one or both of a anion exchange membrane and a cation exchange membrane may be disposed within a volume defined by the first and second electrodes. In certain embodiments, two or more cation exchange membranes may be placed between the first and second electrodes. In certain embodiments, two or more anion exchange membranes may be arranged between the first and second electrodes.

The selected cycle rate(s) affects the performance and life of the device. In certain embodiments, the cycle rate is maintained to be uniform over a duty period. While in other embodiments, the cycle rate is controlled by the controller to vary over the duty period. Sensors may work in conjunction with the controller so that feedback from the sensors allows the controller to respond to changing conditions. Such conditions may include the content and makeup of the feedwater, the salinity or ion concentration of the output water, the demand for the output water, or the cost or availability of electrical current. In certain embodiments, one or more of the cycle rate, duration, or current amount are tied to a feedback mechanism that monitors the feedwater properties.

During a cycle there may be operating modes that include a deionization stage and a recovering stage. During the deionization stage, a direct current power supply passes a forward electrical direct current (If) to the first and second electrodes for a first duration (t1), so as to power a first positive electrode and second negative electrode. During the recovering stage, the power supply sends a reverse electrical direct current (Ir) to each of the first and the second electrodes in a direction opposite to the forward electrical direct current for a second duration (t2). The frequency of each cycle of the several cycles over an operating period may be as discussed hereinabove.

The cycle rate may be greater than about 100 hertz. The cycle rate may be less than about 10 kilohertz. In one embodiment, the cycle rate is in a range of from about 100 hertz to about 500 hertz, from about 500 hertz to about 1 kilohertz, from about 1 kilohertz to about 2 kilohertz, from about 2 kilohertz to about 5 kilohertz, or from about 5 kilohertz to about 10 kilohertz. Selection of the cycle rate may affect performance and longevity of the device, and is discussed further herein.

As noted above, the above-mentioned cycles include at least the first and second operating modes. The duration of each cycle can be less than about 10 seconds. In one embodiment, the duration can be in a range of from about 10 seconds to about 5 seconds, from about 5 seconds to about 1 second, from about 1 second to about 0.5 seconds, from about 0.5 seconds to about 0.005 seconds, from about 0.005 seconds to about 0.00005 seconds, from about 0.00005 seconds to about 0.000005 seconds, or less than about 0.000005 seconds.

The ratio of the duration of the time in the first mode of operation relative to the duration of time in the second mode of operation in each cycle may be greater than about 0.001. In certain embodiments, a ratio of the duration of the time in the first mode of operation relative to the duration of time in the second mode of operation is in a range of from about 0.01 to about 0.02, from about 0.02 to about 0.05, from about 0.05 to about 0.1, from about 0.1 to about 0.12, from about 0.12 to about 0.13, from about 0.31 to about 0.15, from about 0.15 to about 0.17, from about 0.17 to about 0.2.

The controller can control the supply of electrical current from the electrical source to one or more electrodes, and can not supply electrical energy for a determined period. In one embodiment, the controller defines a third mode of operation in which there is no electrical current supplied from the electrical source. The third mode of operation can occur between the first mode of operation and the second mode of operation. Thus, the third mode can be an idle period, allow for a defined dwell time, or can allow for a capacitance charge build. The rate of charge build in the electrodes, then, may be affected by such factors as the duration of the third mode of operation.

An active reversing stage may be implemented between two of the cycles. The power supply passes an electrical direct current (Ia) to the at least one electrode in a direction contrary to the forward electrical direct current (If) for a duration (t4).

A duration ratio of the duration (t1) relative to a sum of duration of (t1) and (t2), is in a range of from about 1:10 to about 1:100. In certain embodiments, a reversal current ratio, which is a ratio of the reversal electrical direct current (Ir) to the forward electrical direct current (If), is in a range of from about 1:10 to about 1:100. In certain embodiments, the cycle may include an idle stage. The idle stage may last for a determined duration (t3). During the idle stage, the power supply may not provide electrical direct current to one or both of the electrodes. In certain embodiments, the idle stage is between the deionization stage and the recovering stage.

During the process feed water may flow into the electrodialysis device. Energize an electrode in the electrodialysis device with a first forward electrical direct current. Monitor an ion concentration in the dilute compartment of the electrodialysis device for an increase in ion concentration relative to a first preset ion concentration. Energize the electrode with an electrical direct current of reverse polarity, before the monitored ion concentration becomes lower than the first preset ion concentration. Monitor an ion concentration in a dilute compartment of the electrodialysis device relative to a second preset ion concentration. Energize the electrode with a second forward electrical direct current in response to the ion concentration in the dilute compartment reaching the second present ion concentration.

Referring to FIG. 1, an illustrative electrodialysis (ED) device 10 includes a first electrode 12 and a second electrode 14 spaced from the first electrode 12 to define a volume. Further, the ED device 10 includes two cation exchange membranes 16, an anion exchange membrane 18 between the two cation exchange membranes 16, and a direct current (DC) source 20. The alternate arranged anion and cation exchange membranes 16, 18 are also referred to as a membrane stack. The membrane stack may include more membranes. A feed stream 22 flows into the ED device 10 in a direction parallel to the membranes. The feed stream 22 may include some dissolved cations ($M^+$) such as $Na^+$, $Ca^{2+}$, and some anions ($X^-$) such as $Cl^-$, and $CO_3^2$.

Upon closing of the circuit including the DC source 20 and the first electrode 12 and second electrode 14, one of the first electrode 12 and second electrode 14 may be energized as a positive electrode and the other may be a negative electrode. The cations $M^+$ migrate toward the negative electrode, while the anions $X^-$ migrate toward the positive electrode. This migration leads to a separation of the dissolved cations and anions in the feed stream 22. A compartment adjacent to a positive side, which may be nearer to the positive electrode, of the anion exchange membrane 18 may be a dilute compartment 24. While a compartment adjacent to a negative side, which may be nearer to the negative electrode, of the anion exchange membrane 18 may be a concentrate compartment 26. The streams that exit out of the dilute compartment 24 and concentrate compartment 26 are respectively dilute and concentrate streams.

Figure 2:
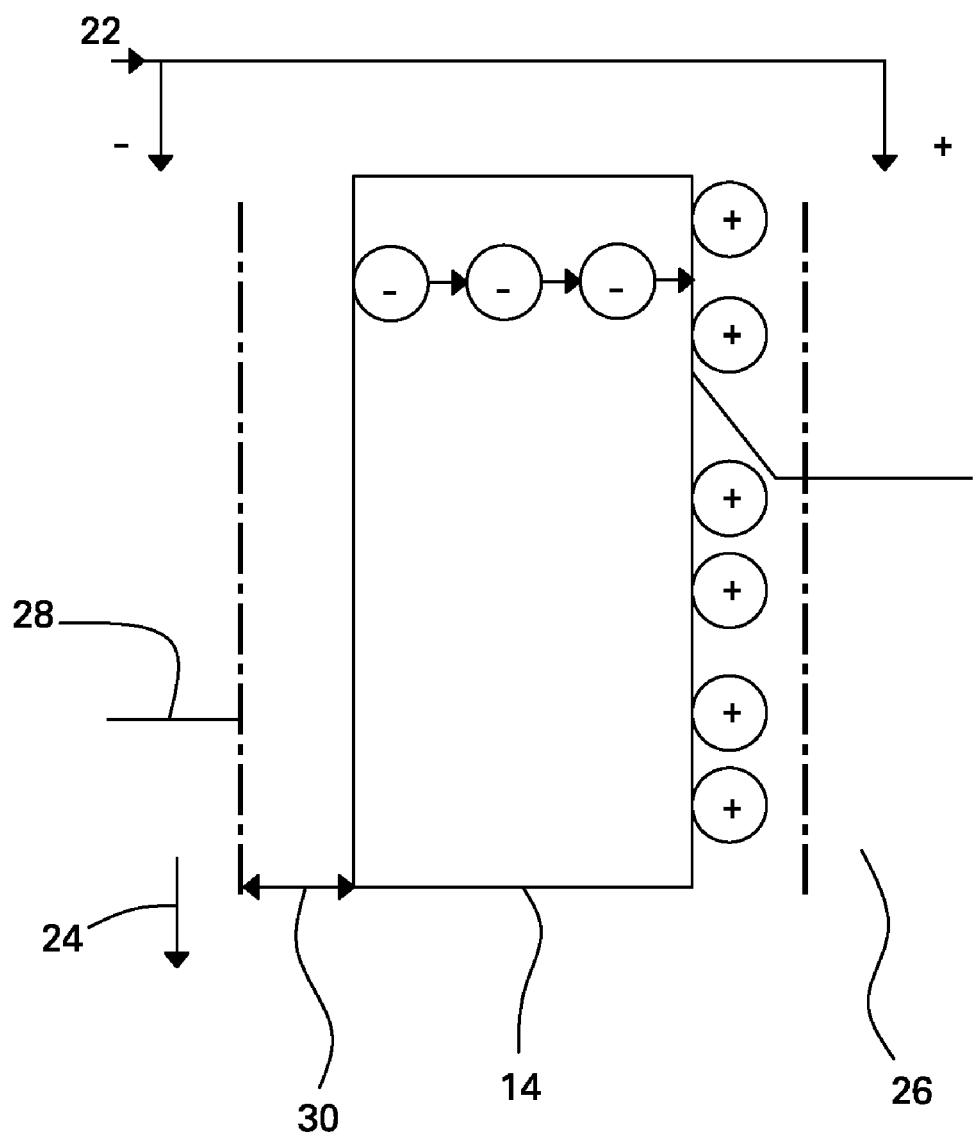
FIG. 2 illustrates a polarization problem adjacent to an anion exchange membrane in a dilute compartment.
Figure 3:
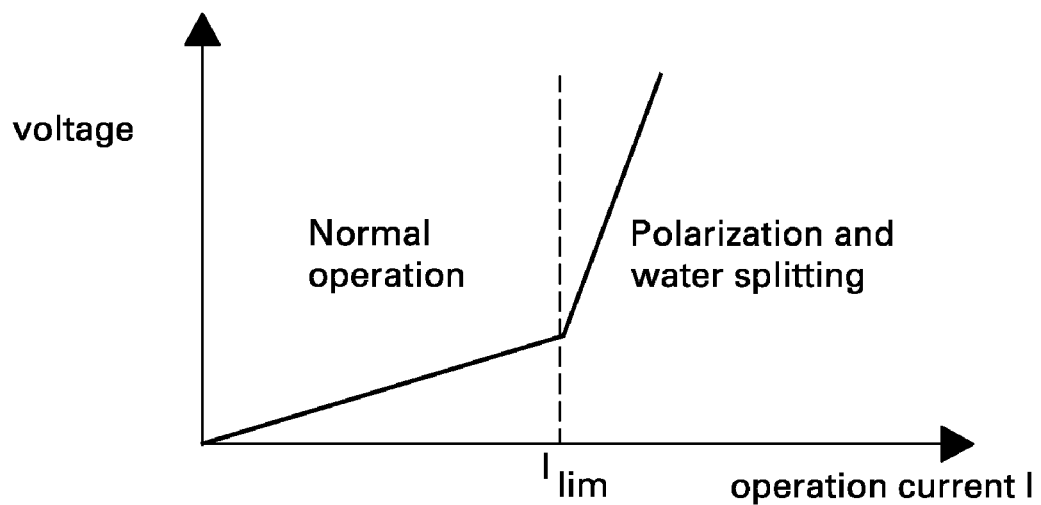
FIG. 3 illustrates a voltage-current curve for the exemplary ED device.

The migration of the anions and cations may lead to polarization at the a boundary layer in the dilute compartment 24 adjacent to the membranes. Referring to FIG. 2, polarization of the anion exchange membrane 18 is shown as an example. For a conventional ED process using a DC source with a substantially constant operation current density (I), at the beginning, ion concentrations in the ED device 10 are all the same as that of the feed stream 22. Once the DC source begins to send the DC current to the first electrode 12 and second electrode 14, cations M+ are driven by an electric force to migrate toward the negative electrode and away from the anion exchange membrane 18, and anions X− are driven to migrate toward the positive electrode and through the anion exchangeable membrane 18. As a result, the concentration of cations adjacent to the anion exchange membrane 18 may decrease. On the other hand, the anion exchange membrane 18 hinders or prevents cations in the concentrate stream 26 from migrating into the dilute stream 24. Therefore, the concentration of cations adjacent to the anion exchange membrane 18 further decreases. A concentration gradient 28 may form adjacent to the anion exchange membrane 18. A Nernst layer, or boundary layer 30, which has a low ion concentration, may form adjacent to the anion exchange membrane 18 in the dilute stream 24. The boundary layer 30 has a thickness (D).

At least two factors may affect cation concentration in the boundary layer 30 from further decreasing. Firstly, turbulence in the feed stream 22 may keep the ion concentration uniform in the feed stream 22. Once the concentration declination tendency reaches the feed stream 22, a convection force of the turbulence may dominate the area and may preclude the concentration decline tendency. The presence and the amount turbulence may determine the thickness (D) of the boundary layer 30, in addition to other factors. Such other factors may include turbidity, viscosity, temperature, and flow rate. Secondly, during the ion declination, a diffusion force drives both cations $M^+$ and anions $X^-$ to move toward the anion exchange membrane 18. This diffusion force enhances the movement of anions in the boundary layer, but it weakens the movement of cations because the diffusion force is reverse to the electrical driving force. If the diffusion force is equal to the electrical force then the concentration gradient may be stable in the boundary layer 30. Such a status is called "stationary stage" herein after.

Figure 4:
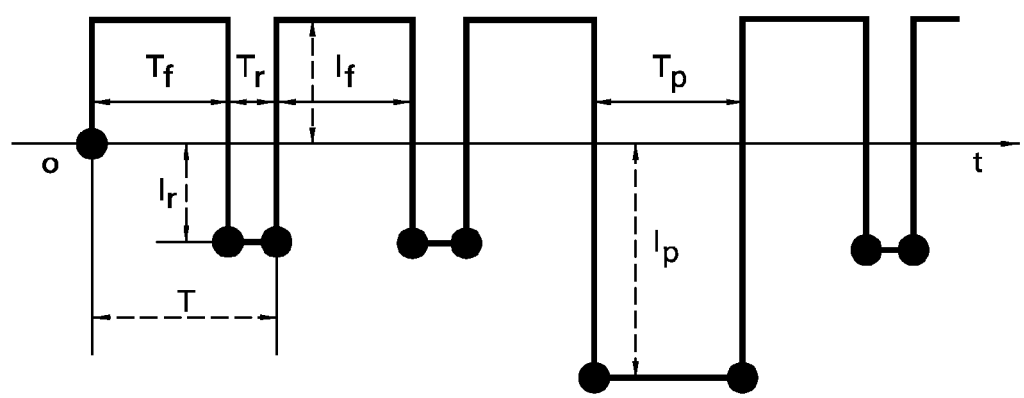
FIG. 4 shows an exemplary pulse signal according to a first embodiment of the invention.

If the operation current density (I) further increases the ion concentration on the surface of the anion exchange membrane 18 decreases. This inverse relationship may be because the increased electrical driving force enhances the diffusion force. When the cation concentration on the surface of the anion exchange membrane 18 may be close to zero, this corresponding current density is the limiting current ($I_{lim}$). If the operation current density (I) is further boosted and is beyond the limiting current density ($I_{lim}$), the current carrier capability of salt ions may be insufficient. If the current carrier capacity capability is insufficient and the operation current density is too high, then water molecules may be split into component ions ($H^+$ and $OH^-$). With reference to FIG. 4, the voltage-current curve of the membrane stack is depicted. When the operation current density (I) is below the limiting current ($I_{lim}$), the voltage increases linearly with the operation current density (I). When the operation current density (I) is beyond the limiting current ($I_{lim}$), water splits and the voltage of the membrane stack increases much faster with current than before, since high voltage drop occurs in the surface of the anion exchange membrane 18. An undesirable amount of energy may be consumed to dissociate water and not to remove salt from the dilute compartment 24. This may reduce water desalination efficiency. Current efficiency may decrease because the electric current may be carried by $H^+$ or $OH^-$ ions.

A limiting current ($I_{lim}$) can be determined experimentally in at least some instances by plotting the electrical resistance across the membrane stack against the electric current, which is a function of the feed flow rate and feed salt concentration for a certain membrane stack. The operating current density (I) may be determined based on the limiting current; $I=I_{lim}*f$, wherein f may be in a range of from about 0.3 to about 0.7.

During operation, a controller (not shown) may direct the current source 20 to provide a pulsed DC current signal to the first electrode 12 and to the second electrode 14. An exemplary pulsed DC current signal is shown in FIG. 4. The pulse DC current signal includes several cycles. Each cycle includes a forward current signal for water desalination and a reverse current signal for recovering of polarization. The forward current signal has a current density ($I_f$) with a forward current duration ($T_f$). The reverse current signal has a reverse current density ($I_r$) with a reverse current duration ($T_r$). Each cycle has a cycle time (T) that includes the forward current duration ($T_f$) and the reverse current duration ($T_r$). During the forward current duration ($T_f$), the first electrode 12 and second electrode 14 may be energized as a positive electrode and a negative electrode, respectively. During the reverse current duration ($T_r$), polarities of the first electrode 12 and second electrode 14 reverse. A ratio of the forward current density ($I_f$) with the limiting current ($I_{lim}$) may be in a range of from about 0.315 to about 0.91, which may be higher than the operation current density (I) of the convention ED devices. It may be possible to control the forward current density ($I_f$) as higher than conventional operation current density (I) to manage the electrodialysis devices. An average current ($I_a$) may be determined by:

$$I_a = \frac{I_f \times T_f - I_r \times T_r}{T_f + T_r} \qquad \text{(equation 1-1)}$$

The water desalination efficiency may be proportional to the average current ($I_a$). By using a higher forward current density If, the average current ($I_a$) can be higher than the operation current density I, and thus improve the desalination efficiency.

During each cycle, the DC source 20 firstly sends the forward DC current to the first electrode 12 and the second electrode 14 for desalination. Before the ion concentration in the boundary layer may be lower than a first preset value (C1), the polarities of the first electrode 12 and second electrode 14 reverse, namely, the DC source 20 sends a reverse current signal with the reverse current density ($I_r$) for one reverse current duration ($T_r$) for recovering the polarization.

Before the ion concentration reaches the stationary status, the DC source 20 may send the reverse current to stop the ion concentration declination. Once the ion concentration increases and reaches a second present value C2, the polarities of the first and second electrodes reverse back, and thus a second cycle starts. Therefore, the forward current density ($I_f$) may be set about 5 percent to about 30 percent higher than the operation current density I of a traditional ED device. The average current density ($I_a$) may be higher than the operation current of traditional current density (I), so as to increase the desalination productivity.

In certain embodiments, the forward current duration ($T_f$), the reverse current duration ($T_r$) are calculated according to Nernst-Planck equation:

$$\frac{\partial c_i}{\partial t} + \nabla \cdot (-D_i \nabla c_i - z_i u_{mi} F c_i \nabla \phi + c_i \vec{u}) = Ri \qquad \text{(equation 1-2)}$$

wherein $\partial c_i/\partial t$ reflects the ion concentration change against time; the term $-D_i \nabla c_i$ reflects diffusion flux caused by the concentration gradient, the term $-z_i um_i F c_i \nabla \Phi$ reflects the migration flux caused by the electric field, and the term $c_i \vec{u}$ is convective flux caused by the flow turbulence; and ($R_i$) refers to a reaction term.

During at least one period of each cycle of the ED process, no reaction occurs and $R_i$ in the Nernst-Planck equation has no contribution to the ion concentration. In one period of the process cycle the current signal from the current source is applied to the first electrode and to the second electrode in a direction opposite to the flow direction of the feed stream 22. In such an instance, the Nernst-Planck equation is simplified when mass transfer phenomena in the boundary layer in a one-dimensional case is considered. The convection flow in the ion migration direction can be neglected. Therefore, the term $c_i \vec{u}$ in the Nernst-Planck equation is omitted. Only the diffusion flux caused by the concentration gradient, and the migration flux caused by the electric field, are considered. The equation 1-2 is simplifies to:

$$\frac{\partial c_i}{\partial t} = \nabla \cdot (D_i \nabla c_i + z_i u_{mi} F c_i \nabla \phi) \qquad \text{(equation 1-3)}$$

The forward and reverse current duration ($T_f$), ($T_r$) may be simulated according to equation 1-3 with commercially available multiphysics analysis software. Suitable software may be obtained through, for example, COMSOL Ltd. (Berne, Switzerland).

EXAMPLES

Example 1

Simulation and Modeling

Figure 5:
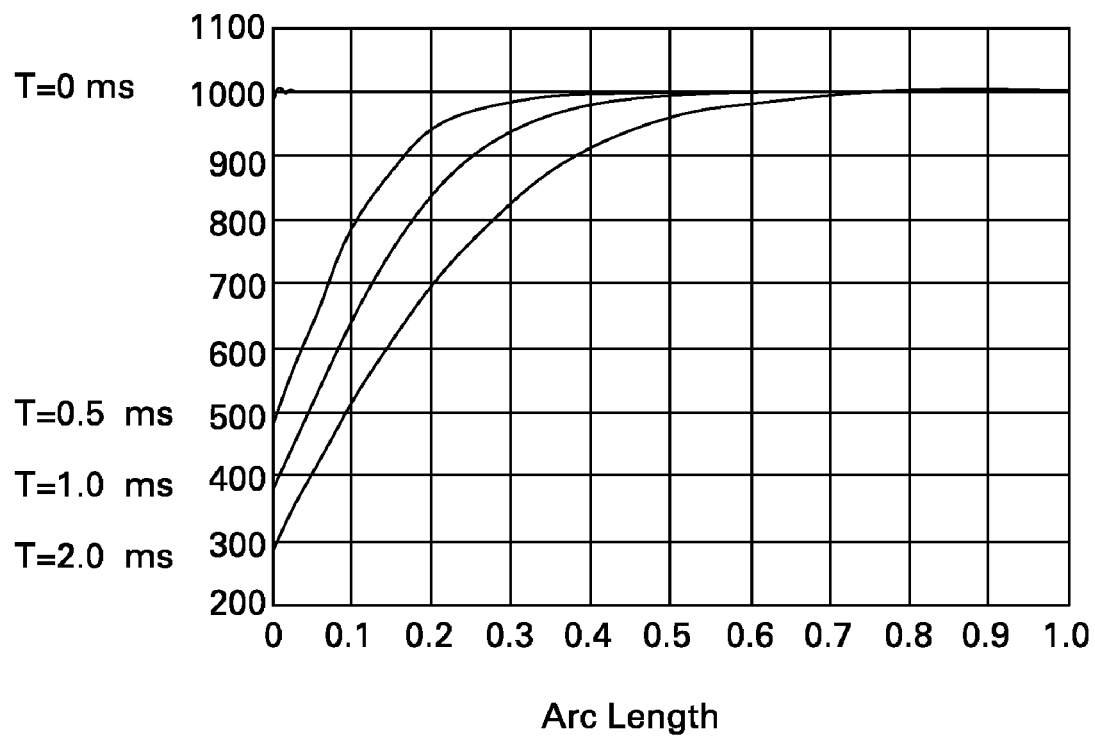
FIG. 5 illustrates a first, second and third exemplary ion concentration-current curves when a forward current signal of the pulse signal is exerted to the ED device.

A NaCl solution is provided with a feed concentration of 1000 PPM, a diffusion coefficient $D=2*10^{-9}$ m$^2$/s, and an electric current density of 25 A/m$^2$, the concentration decay against time is shown in FIG. 5 when the electric potential is positively charged. The simulation result shows that the concentration at membrane wall decreases to 400 parts per million after approximately 1 microsecond (ms).

Figure 6:
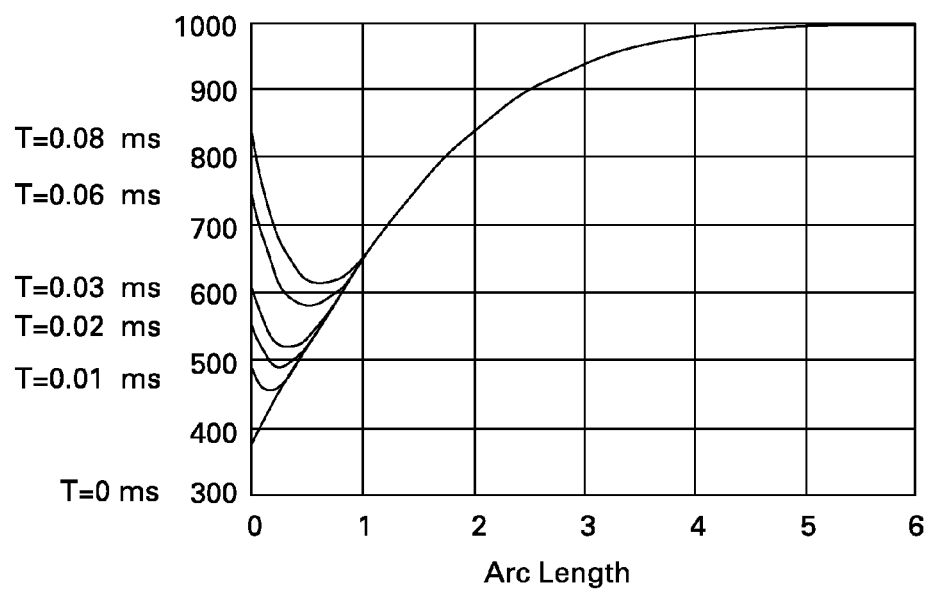
FIG. 6 illustrates a first, second and third exemplary ion concentration-current curves when a reverse current signal of the pulse signal is exerted to the ED device.

Taking the concentration distribution of 1 microsecond in FIG. 5 as initial values, the generation of a reverse pulse with an electric current that is 1.2 times higher than the charged positive current (i.e., 1.2*25 A/m$^2$), then the concentration recovery near the membrane is shown in FIG. 6. The result shows that it would take 0.03 ms for the concentration to recover from 400 parts per million to 600 parts per million.

After the simulation is made, experiments may verify and select a desirable parameter set for each of ($I_f$), ($I_r$), ($T_f$), and ($T_r$). In the experiment, the deionization time ($T_1$), the ratio of the reversal current to forward current $K_i=I_r/I_f$, and the ratio of reversal time to forward time $K_t=T_2/T_1$, are independently controlled.

For each cycle, the forward current duration ($T_f$) should be greater than about 80 percent. In one embodiment, the forward current duration is in a range of from about 80 percent to about 85 percent, from about 85 percent to about 90 percent, from about 90 percent to about 95 percent, or from about 95 percent to about 99 percent of the cycle time T. Controlling the forward current duration optimizes the desalination productivity.

Referring to FIG. 4, in certain embodiments, the pulse current signal further includes a second reverse current signal with a second reverse current density ($I_p$) and a second reverse current duration ($T_p$) between the forward current signals of two adjacent cycles. The second reverse current duration ($T_p$) is longer than the reverse current duration ($T_r$). The second reverse current density ($I_p$) may be bigger than the reverse current density. Whereby, scaling or fouling formed on the membranes can be removed.

Figure 7:
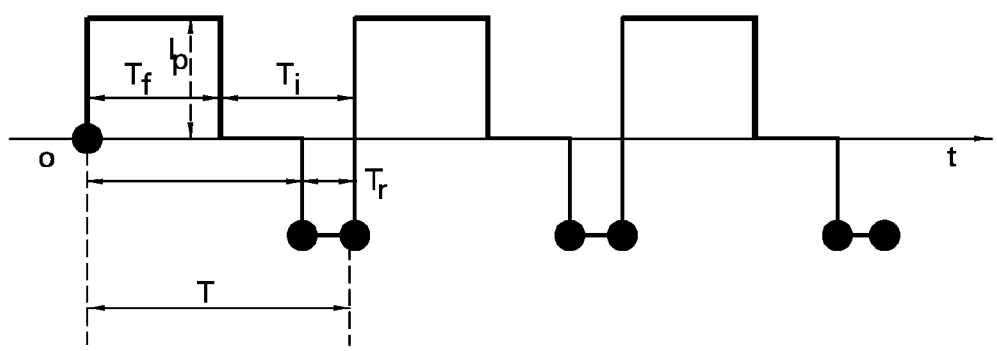
FIG. 7 illustrates an exemplary pulse signal according to a second embodiment of the invention.

Referring to FIG. 7, in which a second embodiment of the pulse current signal is shown. The second embodiment of the pulse current signal includes a forward current signal for positively charging the first and second first and second electrodes 12, 14, a reverse current signal in a contrary direction of the forward current signal, and an idle without any current signal between the forward and reverse current signals.

The singular forms "a", "an" and "the" include plural referents unless the context clearly dictates otherwise. Approximating language, as used herein throughout the specification and claims, may be applied to modify any quantitative representation that could permissibly vary without resulting in a change in the basic function to which it is related. Accordingly, a value modified by a term or terms, such as "about" is not limited to the precise value specified. In some instances, the approximating language may correspond to the precision of an instrument for measuring the value. Similarly, "free" may be used in combination with a term, and may include an insubstantial number, or trace amounts, while still being considered free of the modified term.

The embodiments described herein are examples of articles, systems and methods having elements corresponding to the elements of the invention recited in the claims. This written description enables those of ordinary skill in the art to make and use embodiments having alternative elements that likewise correspond to the elements of the invention recited in the claims. The scope of the invention thus includes articles, systems and methods that do not differ from the literal language of the claims, and further includes other articles, systems and methods with insubstantial differences from the literal language of the claims. While only certain features and embodiments have been illustrated and described herein, many modifications and changes may occur to one of ordinary skill in the relevant art. The appended claims cover all such modifications and changes.

The invention claimed is:

1. An electrodialysis process using an electrodialysis device, the process comprising a plurality of cycles, at least one of the plurality of cycles comprising:

a deionization stage, in which a direct current power supply passes a forward electrical direct current signal with a forward current density ($I_f$) to a first positive and a second negative electrode for a first duration (t1), so as to power the first positive electrode and second negative electrode; and a recovering stage, in which the power supply sends a reverse electrical direct current signal with a first reverse current density ($I_r$) to each of the first and the second electrodes in a direction opposite to the forward electrical direct current signal for a second duration (t2), and the frequency of each cycle of the pluralities of cycles over an operating period is in a range of about 100 hertz to about 10 kilohertz, wherein the process further comprises at least one reversing stage between two cycles, the power supply passing a second reverse electrical direct current signal with a second reverse current density ($I_p$) to the first and second electrodes in a direction contrary to the forward electrical direct current signal for a duration (t4), the second reverse current density ($I_p$) being larger than the first reverse current density ($I_r$).

2. The electrodialysis process as defined in claim 1, wherein a duration ratio of the duration (t1) relative to a sum of duration of (t1) and (t2), is in a range of from about 1:10 to about 1:100.

3. The electrodialysis process as defined in claim 1, wherein a reversal current ratio, which is a ratio of the reversal electrical direct current ($I_r$) to the forward electrical direct current ($I_f$), is in a range of from about 1:10 to about 1:100.

4. The electrodialysis process as defined in claim 1, wherein at least one of the plurality of cycles has an idle stage for a duration (t3), and during which the power supply does not pass electrical direct current to both of the electrodes.

5. The electrodialysis process as defined in claim 4, wherein the idle stage is between the deionization stage and the recovering stage.

* * * * *